Feb. 4, 1930.  R. HOLLE  1,745,694
MECHANICAL HAMMER
Filed May 1, 1926  2 Sheets-Sheet 2
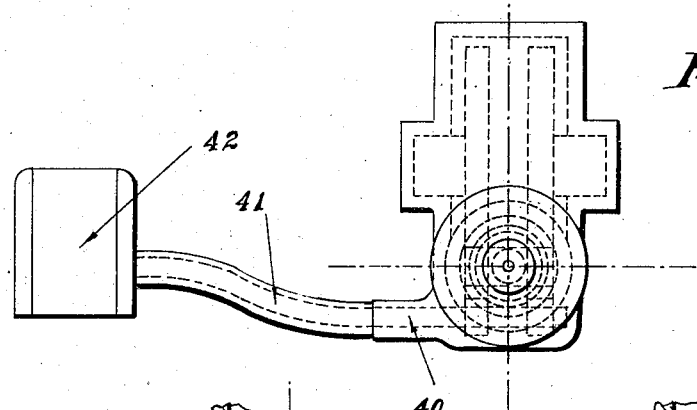
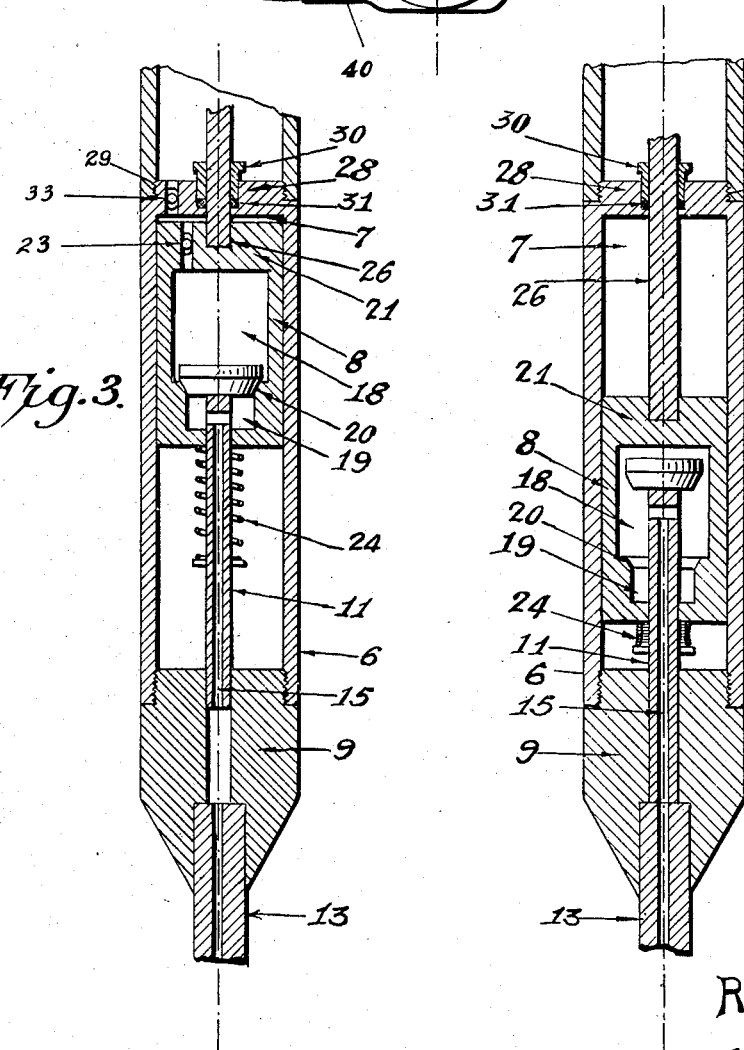
Inventor
Roy Holle,
By Murray & Fugelter
Attorneys.

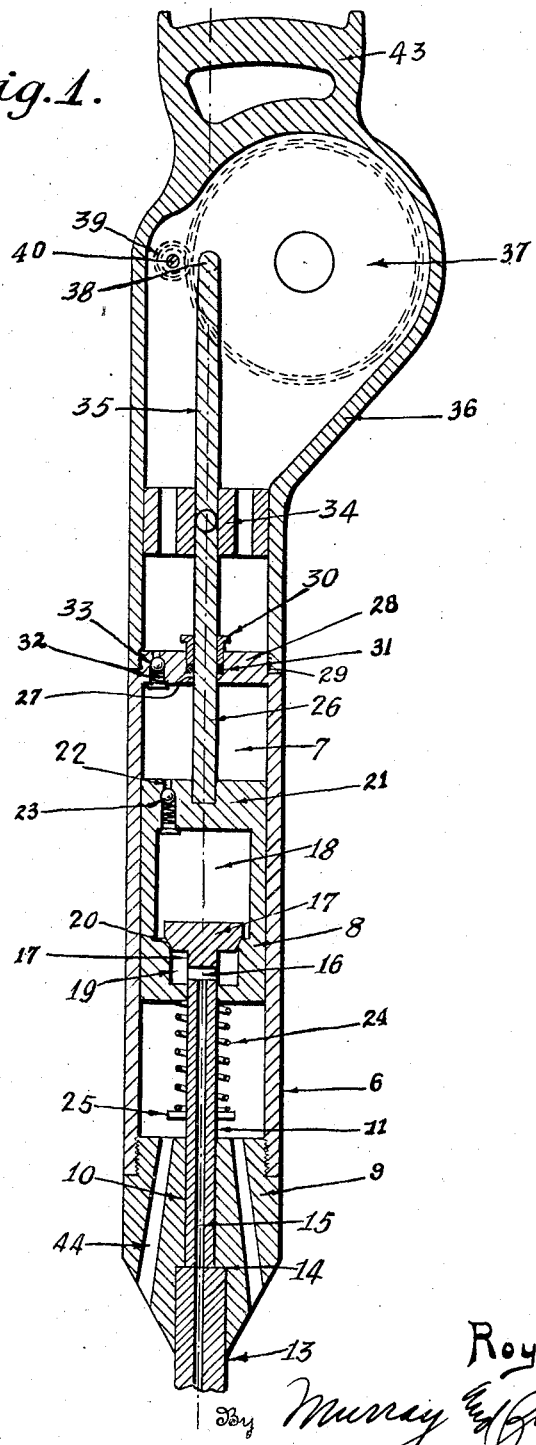

Patented Feb. 4, 1930

1,745,694

UNITED STATES PATENT OFFICE

ROY HOLLE, OF MOUNT HEALTHY, OHIO

MECHANICAL HAMMER

Application filed May 1, 1926. Serial No. 106,078.

This invention relates to mechanical hammers and has for an object the provision of a power hammer in which the power consumption is equalized to the end that a smoothly operating and efficient device is produced.

Another object is to provide a device of this kind wherein the power consumption is equalized over a complete cycle thereof.
Another object is to provide a device of the class referred to which will deliver a maximum impact for the power consumed.

These and other objects are attained by the means described herein and disclosed in the accompanying drawing, in which:

Fig. 1, is a longitudinal sectional view of a device of my invention showing the relation of parts at the instant of delivering its impact to a tool.
Fig. 2, is a fragmental longitudinal sectional view of the device showing the relation of parts at the end of its impact stroke.

Fig. 3, is a similar view showing the relation of parts at the end of its return stroke.
Fig. 4, is an end view of the device connected to a source of power.

While the device of my invention is shown herein as embodied in a portable tool, it will be readily understood that the invention may also be adapted to use in other power hammers or power rams.

Referring to Fig. 1, casing 6 has an elongated chamber 7 in which a piston 8 is reciprocally mounted. The forward end 9 of the casing 7 has a central reduced bore 10 through which a hollow stem 11 of a valve 12 may reciprocate for delivering an impact stroke to a tool 13 seated in a shouldered recess 14 in the end of the casing. The stem 11 has a longitudinal bore 15 and a transverse communicating bore 16 in its opposite end 17 which is disposed within a compression chamber 18 in piston 8. A reduced bore 19 in the piston provides a valve seat 20 upon which valve 12 may seat, thereby sealing the one end of the compression chamber against communication with the atmosphere. At the upper end or top 21 of the piston 8 is a passage 22 having a check valve 23 which serves to admit air through passage 22 into the chamber 18 but precludes exhaust thereof from said chamber.

A spring 24 encircles stem 11, extending between stop 25 secured to the stem and the bottom of piston, serves to normally retain valve 12 on its seat 20. A piston rod 26 may be screw threaded or otherwise secured to the piston 8 and is mounted for reciprocation in a bore 27 in a closing member or head 28 secured by any suitable means such as by screw threads 29, within the chamber 7. A stuffing gland 30 retains packing 31 about the piston rod to provide an air-tight seal about said piston rod as it reciprocates through the stationary head 28. The head or closure member 28 has an air passage 32 governed by a check valve 33 and this valve closes when the piston 21 moves toward a closure head 28. Above the closure member 28 is a reciprocating cross head 34 which carries the end of piston rod 26 and the end of a drive arm 35 pivoted to said piston rod. A housing 36 mounted on the end of the casing 6 has revolubly mounted therein a pair of spaced drive gears 37 to which the drive arm 35 is eccentrically mounted on a shaft 38. The drive gears 37 are actuated from a pinion 39 carried by a shaft 40 which extends through the housing and has coupled thereto a flexible shaft 41 operated from a suitable source of power such as a small electric motor 42. Handle member 43 may be made integral or secured to the housing 36 and serves to guide the tool during operation.

The operation of the device is as follows: When it is desired to use the hammer with a chipping chisel, star drill or the like, such tool 13 is inserted in the shouldered socket 14 in the casing and the gears 37 are set in motion through pinion 39 on shaft 40.

The device of my invention is particularly adapted to use in such places where a workman may have available a source of electric current but not a source of compressed air such as is frequently used for operating tools of this general character. When the source of power such as the electric motor 42 is actuated the gears 37 are rotated and the drive arm 35 converts the rotatory movement of the gears into a reciprocation of the piston rod

26. The spring 24 normally retains the valve 12 upon its seat so that when the piston rod moves the piston 8 upwardly toward the closure member 28, the check valve 33 closes and the check valve 23 in the piston 8 opens, thereby compressing the air contained in the compression chamber 18 and in that part of the main chamber 7 between the top of the piston and the bottom of the closure head 28 into the compression chamber 18 as the top 21 of the piston approaches the closure head 28. When the drive arm 35 leaves its highest point, the piston rod 26 has moved the piston 8 upwardly and in close proximity to the bottom of closure member 28 (see Fig. 3). As the drive arm moves over top center it begins to move the piston rod and piston downwardly whereupon check valve 33 opens and check valve 23 immediately closes retaining therein the air under pressure which resists unseating of the valve 12. The piston is now rapidly descending carrying with it the valve and valve stem 11. When the piston attains its maximum velocity on its downward or impact stroke, the end of valve stem strikes the end of tool 13, delivering thereto a force equal to the impact of the valve and stem plus the force of the compressed air on the valve and the force necessary to overcome the resistance of spring 24. The resultant impact having been delivered to the tool, the piston continues on its downward stroke, the air from chamber 18 exhausts through stem 11 and hollow tool 13. The air in the lower part of the chamber below the piston is forced out through suitable exhaust ports 44. The exhausted air may be directed onto the work operated upon by the tool for blowing away chips if desired. It should be noted that when the valve 12 unseats the compressed air in chamber 18 will find its way into restricted bore 19 below the valve seat and from thence to communicating bores 16 and 15 in the stem 11. The spring 24 is made heavy enough to preclude rebound of the stem 11 upon delivery of the impact stroke. The valve 12 remains open as the piston travels downwardly to the limit of its stroke and returns upon its upward travel. It will be noted therefore that the chamber 18 will be in open communication with the atmosphere for a time until during its return stroke the compressional force is taken from the spring 24 whereupon the valve 12 will immediately seal the lower end of the piston and the air contained within the compression chamber 18 and the chamber 7 above the piston will again be almost entirely compressed into the chamber 18.

It should be noted that the power consumed performs the work of compressing the air in chamber 18 on its return stroke instead of merely idling as is usual in such movements. It will be apparent that this energy is stored and utilized at the moment of impact. In this way there is an even distribution of the load at all times so that the device operates smoothly and provides a maximum efficiency for the power consumed.

It will be readily apparent that the simpler embodiment of my invention as shown herein may be modified within the purview of this invention, wherefore I do not limit myself to the exact structure shown, but claim my invention broadly as indicated in the appended claims.

What I claim is:

1. In a mechanical hammer the combination with a casing, of a hollow piston mounted for reciprocation in the casing, an impact delivering stem reciprocally mounted in the hollow piston the stem and valve being connected, a valve normally sealing the piston, valve means for admitting air for compression in the piston, and power means for reciprocating the piston whereby the piston on its idling stroke compresses air within its hollow interior and augments the impact delivered on its work stroke by the force required to unseat the valve against the air under compression within said piston.

2. In a device of the class described the combination of a tool casing, a piston having a compression chamber therein, a normally closed valve sealing the compression chamber, an impact stem on said valve, means for reciprocating the piston and valve, means in the piston and casing permitting compression of air in the chamber as the piston moves in one direction, movement of the piston in the opposite direction serving to deliver the impact of the valve stem to a tool whereby the valve is unseated against the resistance of the air pressure upon said valve.

3. In a mechanical hammer having a reciprocating hollow piston, an impact stem carried by the piston, a valve associated with the stem within the piston for controlling a charge of compressed air in the piston, means for reciprocating the piston in the casing and valve means permitting compression of air in the hollow piston as the piston moves in one direction, said compressed air being retained in the piston and serving to resist unseating of the valve when the impact stem delivers an impact to a tool.

4. In a device of the class described the combination of a casing, a hollow piston in the casing, a stem reciprocable in the piston and having a valve normally closing said piston, means for reciprocating the piston, means for causing compression of air in the piston as it moves in one direction, the compressed air serving to retain said valve in closed position, and a tool seated in the casing in the path of the stem for receiving an impact from the stem when the piston is moved in the opposite direction.

5. In a mechanical hammer having a hollow reciprocating piston, an impact stem carried by said piston, said stem and piston forming a valve controlling a charge of compressed air within the piston, means for reciprocating the piston and a second valve permitting compression of air in the piston as it moves in one direction and adapted to close upon reversal of movement of the piston whereby to resist unseating of the stem in the piston for permitting unitary movement of the piston and stem on reverse movement of the piston.

6. In a mechanical hammer the combination of a casing having a tool receiving bore and adjacent exhaust pressure bore in its forward end, a piston reciprocable in the casing, a hollow impact stem carried by the piston, a hollow tool in the tool receiving bore in the casing and valve means for compressing air in the piston, said hammer being adapted to release the compressed air through the hollow impact stem and tool for blowing chips out of a hole cut by the tool, said exhaust pressure bore also serving to direct air alongside the tool for blowing chips away from the edge of the hole.

In testimony whereof, I have hereunto subscribed my name this 24th day of April, 1926.

ROY HOLLE.